United States Patent [19]

Kim

[11] Patent Number: 5,671,011

[45] Date of Patent: Sep. 23, 1997

[54] APPARATUS FOR DISPLAYING A TEST PATTERN BY REPEATING A UNIT PICTURE AND METHOD THEREOF

[75] Inventor: Soon-doo Kim, Seongnam, Rep. of Korea

[73] Assignee: Samsung Electronics Co., Ltd., Kyungki-do, Rep. of Korea

[21] Appl. No.: 471,271

[22] Filed: Jun. 6, 1995

[30] Foreign Application Priority Data

Jun. 9, 1994 [KR] Rep. of Korea ............... 94-12941

[51] Int. Cl.$^6$ .................................................. H04N 17/04
[52] U.S. Cl. ........................ 348/189; 348/190; 348/181
[58] Field of Search ................................ 348/180, 181, 348/182, 184, 188, 806, 807, 745, 746, 747, 170; 358/500; 345/904; H04N 17/00, 17/02, 3/22, 3/26, 9/28

[56] References Cited

U.S. PATENT DOCUMENTS

| | | |
|---|---|---|
| 4,513,318 | 4/1985 | Wilensky et al. ............ 348/181 |
| 4,635,096 | 1/1987 | Morgan ........................ 348/181 |
| 4,672,275 | 6/1987 | Ando ............................ 348/190 |
| 4,742,387 | 5/1988 | Oshima ........................ 348/180 |
| 4,860,510 | 8/1989 | Spieth et al. ............. 315/368.12 |
| 5,103,303 | 4/1992 | Shoji et al. ................ 358/500 |
| 5,214,499 | 5/1993 | Gleim et al. ................ 348/189 |
| 5,319,446 | 6/1994 | Emmoto et al. ............ 348/181 |
| 5,440,340 | 8/1995 | Tsurutani et al. .......... 348/182 |
| 5,537,145 | 7/1996 | Miseli ......................... 348/181 |

Primary Examiner—Victor R. Kostak
Attorney, Agent, or Firm—Sughrue, Mion, Zinn, Macpeak and Seas

[57] ABSTRACT

A test pattern display apparatus and method thereof for adjusting the display parameters of a television picture, font data in the form of a test pattern stored in a font memory. The test pattern can be internally generated and displayed as needed, by a key input. The microcomputer repeatedly reads the font data of the selected test pattern, to form an entire test pattern, whenever accurate picture adjustments is desired.

5 Claims, 5 Drawing Sheets

RED | BLUE | WHITE
MAGENTA  YELLOW

FIG. 3A
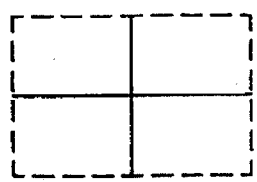
FIG. 3B
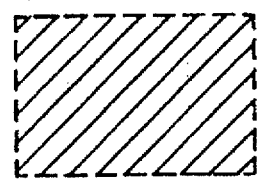
FIG. 4
| R 11 | R 12 | R 13 | | R 1(n-1) | R 1n |
|---|---|---|---|---|---|
| R 21 | R 22 | R 23 | | R 2(n-1) | R 2n |
| R 31 | R 32 | R 33 | | R 3(n-1) | R 3n |
| | | | R ij | | |
| R (m-1)1 | R (m-2)2 | R (m-3)3 | | R(m-1)(n-1) | R (m-1)n |
| R m1 | R m2 | R m3 | | Rm(n-1) | Rmn |

5,671,011

APPARATUS FOR DISPLAYING A TEST PATTERN BY REPEATING A UNIT PICTURE AND METHOD THEREOF

BACKGROUND OF THE INVENTION

The present invention relates to a test pattern display apparatus and method thereof, and more particularly to a test pattern display apparatus and method for storing font data for forming a test pattern, and displaying test pattern for picture adjustment by using the stored font data.

Conventional television displays can be largely classified into black-and-white televisions (i.e., achromatic) and color televisions (i.e., chromatic), the former using only the luminance signal for image formation and the latter using a combination of the luminance and color signals. Each type has user-access display adjustments. That is, using the luminance signal (Y) of a black-and-white television, a user can perform display adjustments, such as brightness, contrast, focus, and pin cushion balance, and, in the case of color television, can make further adjustments for color and tint using the color signal (RGB) in addition to the luminance signal (Y).

In order to perform these adjustments accurately, a video signal input is necessary, and it is desirable to have a constant video signal displayed for a period of time. This is best accomplished by receiving a broadcast test pattern or an input from an external test pattern generator. Examples of test pattern displays are shown in FIGS. 1A and 1B, in which FIG. 1A shows a crosshatching pattern and FIG. 1B is a color bar pattern. Generally, FIG. 1A is used for focus and brightness adjustments while FIG. 1B is used for color, tint, etc. adjustments.

However, since broadcast stations seldom provide such test patterns and a test pattern generator is a costly piece of equipment, accurate picture adjustment by the user is inconvenient.

SUMMARY OF THE INVENTION

Accordingly, it is an object of the present invention to provide a test pattern display apparatus in which picture adjustments can be made accurately and easily, by providing a memory for storing font data for forming a test pattern and using the font data to display test pattern as needed.

It is another object of the present invention to provide a test pattern display method in which test patterns can be displayed at any time, without the need for a test pattern generator.

To accomplish the above first object of the present invention, there is provided a test pattern display apparatus for use in a television set, the apparatus comprising: storage means for storing font data constituting at least one type of test pattern of a predetermined shape; control means for repeatedly reading the stored font data and repeatedly outputting a drive signal corresponding to the read font data; drive means for converting the output drive signal into an image signal and outputting the converted image signal; and display means for displaying the converted image signal as the test pattern.

A test pattern displaying method for displaying at least one type of test pattern for picture adjustment by storing font data for forming the at least one type of test pattern, comprises the steps of: selecting a test pattern type according to a key input; repeatedly reading the stored font data according to the selected test pattern type; forming the test pattern corresponding to the selected pattern type based upon the repeatedly read font data; and displaying the formed test pattern.

BRIEF DESCRIPTION OF THE DRAWINGS

The above objects and advantages of the present invention will become more apparent by describing in detail a preferred embodiment thereof with reference to the attached drawings in which:

FIG. 3A and FIG. 3B are views showing a unit picture according to font data in order to form test patterns such as those in FIGS. 1A and 1B, respectively;

FIG. 4 is a state view to explain a method for displaying the unit picture shown in FIG. 3A and FIG. 3B;

DETAILED DESCRIPTION OF THE INVENTION

Figure 2:
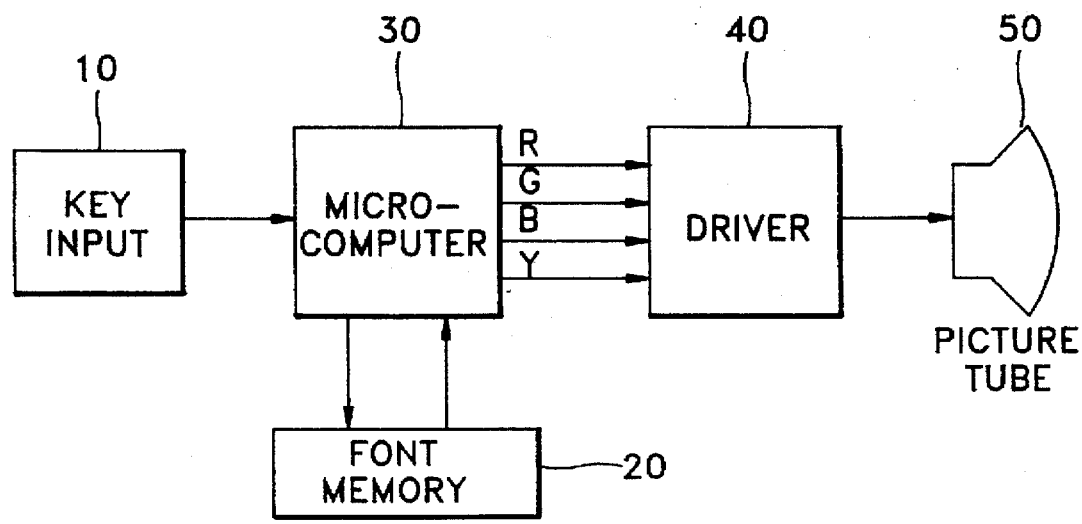
FIG. 2 is a block diagram of one embodiment of a test pattern display apparatus according to the present invention.

FIG. 2 shows one embodiment of a test pattern display apparatus according to the present invention. The test pattern display apparatus includes a key input 10 provided with picture-state manipulation keys, a font memory 20 for storing the font data for forming at least one type of test pattern, a microcomputer 30 which reads the font data stored in font memory 20 according to a key input from key input 10 and outputs a display drive signal (R, G, B and Y) corresponding to the read font data, a driver 40 for receiving the drive signal output from microcomputer 30 and outputting an image signal for forming the test pattern, and a picture tube 50 for displaying the test pattern by the image signal supplied from driver 40.

Here, key input 10, by which a user selects the test pattern displayed on picture tube 50 and performs picture adjustments in accordance therewith, also provides the normal compliment of keys for ordinary television functions, such as channel selection and volume control. Key input 10 may be attached to the television's front or rear panel or in the form of a remote controller.

Since font memory 20 needs a large capacity for storing the font data corresponding to the displayed entire test pattern, font memory 20 stores only minimum data for displaying an entire picture in order to minimize memory capacity. Namely, font memory 20 stores a unit picture for forming the test pattern such as a crosshatching pattern and a color bar pattern. Also, the drive signal provided from microcomputer 30 differs according to the type of television provided, i.e., black-and-white or color.

Now, operation of the apparatus shown in FIG. 2 will be explained with reference to FIGS. 1A & 1B, 2, 3A & 3B and 4.

First, referring to FIG. 2, if the user operates a key of key input 10 for displaying the test pattern on picture tube 50 and adjusting the picture, a key signal corresponding to the operated key is input to microcomputer 30. Microcomputer 30 outputs an address signal for reading corresponding data to font memory 20, and reads font data for forming the test pattern, if the key signal for displaying the test pattern is input. The read data is provided to driver 40 as a drive signal (R, G, B and Y) by microcomputer 30.

At this time, data stored in font memory 20 is a unit picture data so that microcomputer 30 outputs repeatedly drive signal (R, G, B and Y) according to the font data to driver 40.

Likewise, if the repeatedly output drive signal is input to driver 40, drive portion 40 converts the drive signal into an image signal for forming the test pattern and supplies the converted image signal to picture tube 50 and the test pattern is displayed. Here, the drive signal for the crosshatching pattern output from microcomputer 30 becomes luminance signal Y, the drive signal for a color bar pattern becomes a composite of the color signal (R, G and B).

Also, the font data of a predetermined unit (see FIG. 3A and FIG. 3B) for forming the crosshatching pattern (FIG. 1A) and the color bar pattern (FIG. 1B) is stored in font memory 20 so that the necessary memory capacity of font memory 20 can be minimized.

If the data for forming a predetermined unit picture as in FIG. 3A and FIG. 3B is stored in the font memory 20, microcomputer 30 outputs the drive signal so that the unit picture is displayed repeatedly in the horizontal axis direction and the vertical axis direction in order to form a test pattern picture of one frame as in FIG. 4. Specifically, microcomputer 30 divides the picture of one frame by n in the horizontal direction, and divides it by m in the vertical direction, and the predetermined unit picture is displayed repeatedly as many times as the divided number in the horizontal and vertical axes.

The operation of microcomputer 30 for forming the test pattern by using the font data stored in font memory 20 will be explained in detail with reference to FIG. 5.

Figure 5:
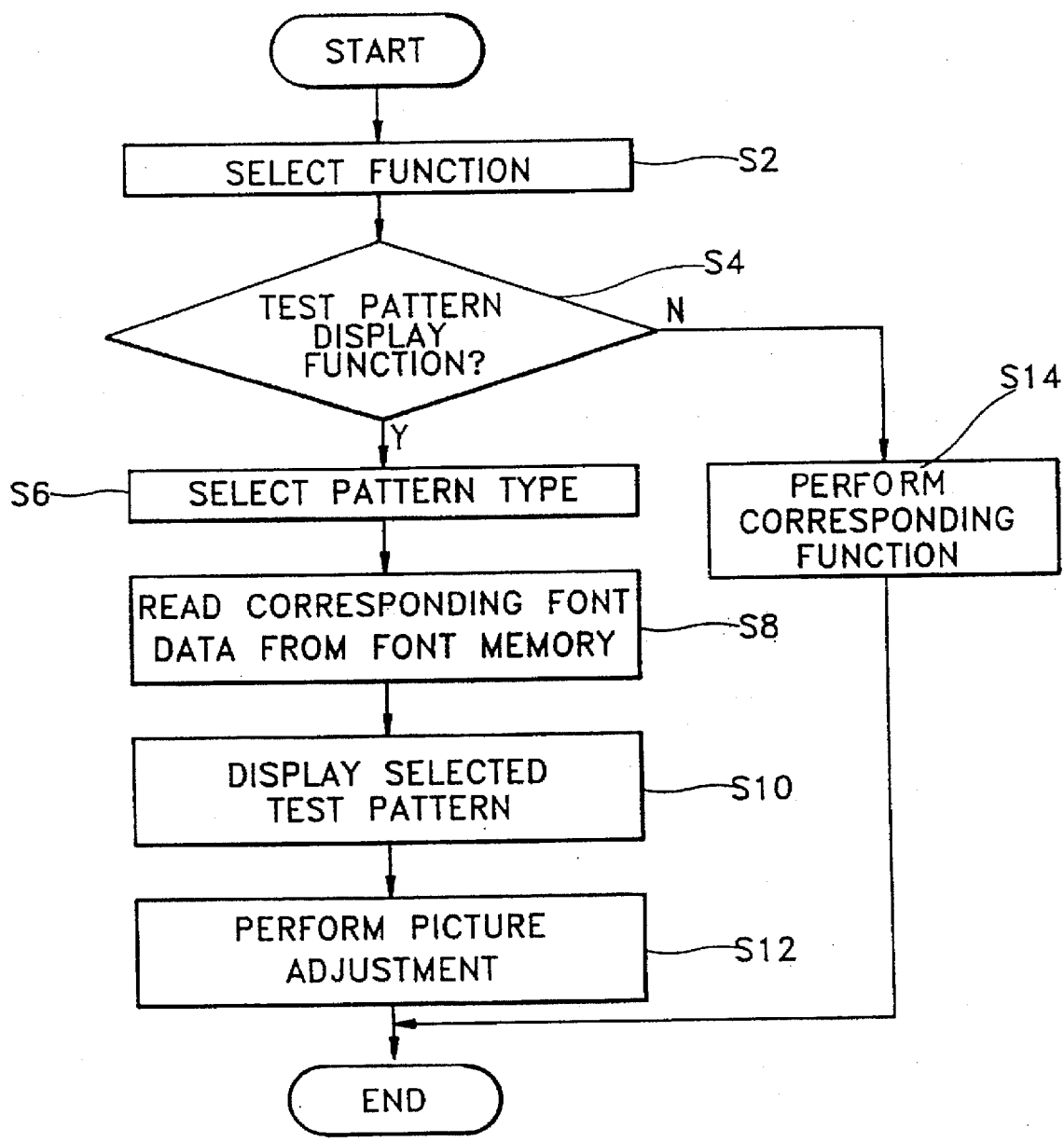
FIG. 5 is a flow chart of one embodiment of a test pattern display method according to the present invention.

According to the flow chart of FIG. 5, at step S2, the user manipulates a key provided on key input 10 and thereby selects a function capable of execution in a television. At step S4, microcomputer 30 determines whether the selected function is the display function of a test pattern, and if so, the pattern type of the test pattern is selected at step S6. This can be a separate keystroke or determined by microcomputer 30 after scanning the key input for pattern selection. Then, in step S8, microcomputer 30 outputs an address signal corresponding to the selected test pattern data (font data), for reading the font data stored in font memory 20. Microcomputer 30 then reads the corresponding font data and outputs a drive signal (R, G & B and/or Y) for forming the desired test pattern display at step S10. Here, the test pattern may be, for example, one of those shown in FIGS. 1A or 1B, or may be any other test pattern of a predetermined shape corresponding to all or part of the screen.

According to the above operation, the user confirms the displayed test pattern formation, and, by manipulation of key input 10, performs picture adjustment in step S12.

Meanwhile, if it is determined at step S4 that a function other than a test pattern display function has been input, the corresponding function is executed at step S14.

The data read from font memory 20 is the font data of a predetermined unit domain portion, examples of which are shown in FIGS. 3A and 3B. Hereinbelow, illustrative procedures for creating the display of the test pattern selected in step S10 will be explained in detail with reference to FIGS. 6 and 7.

Figure 1A:
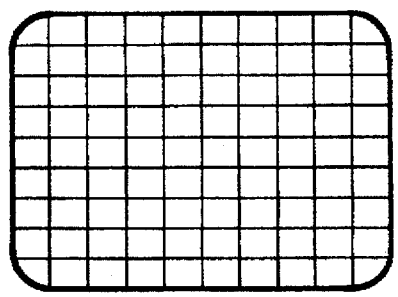
FIG. 1A and FIG. 1B are test pattern examples.
Figure 6:
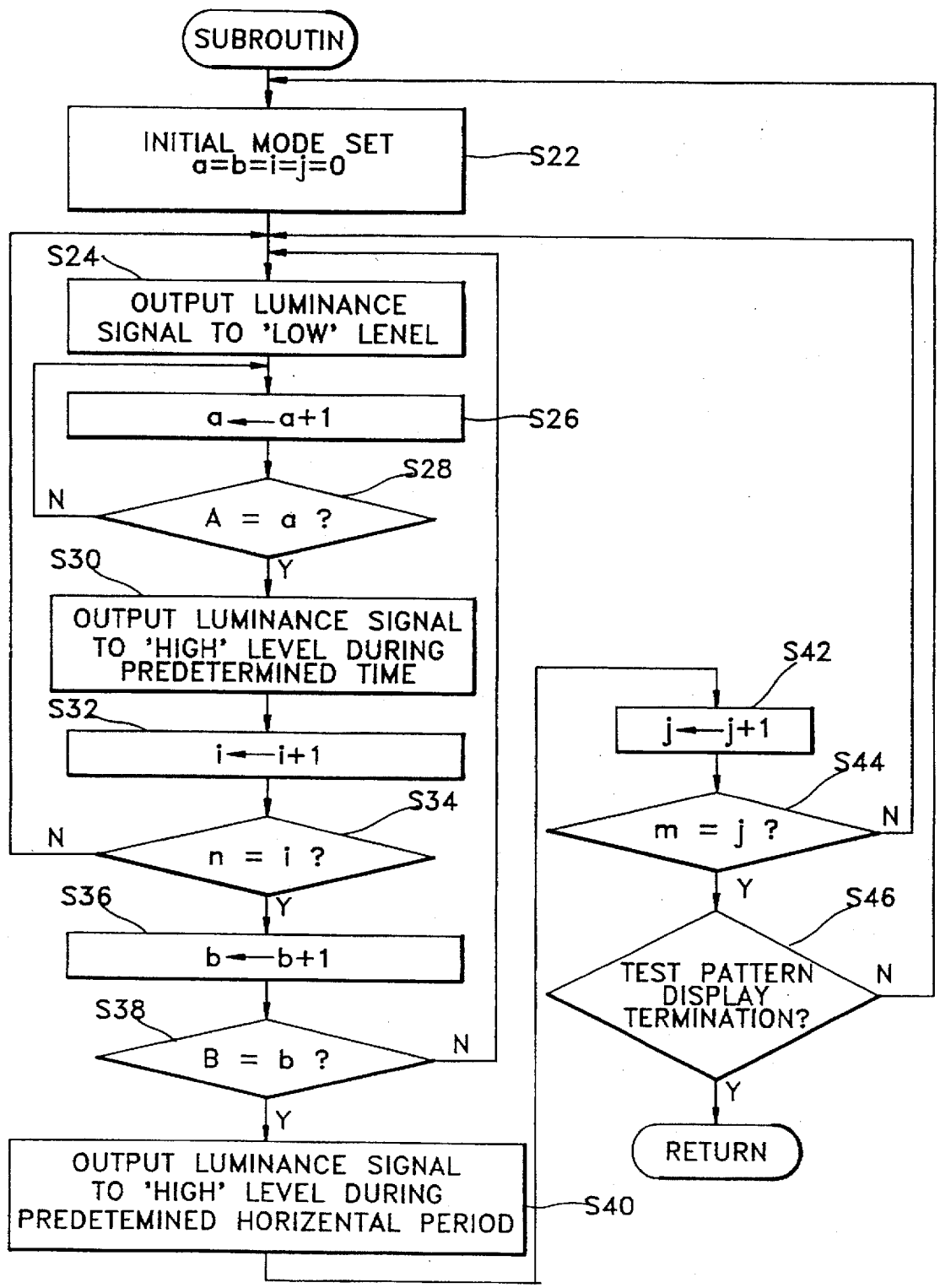
FIGS. 6 and 7 are detailed flow charts of examples of the test pattern display step shown in FIG. 5.
Figure 7:
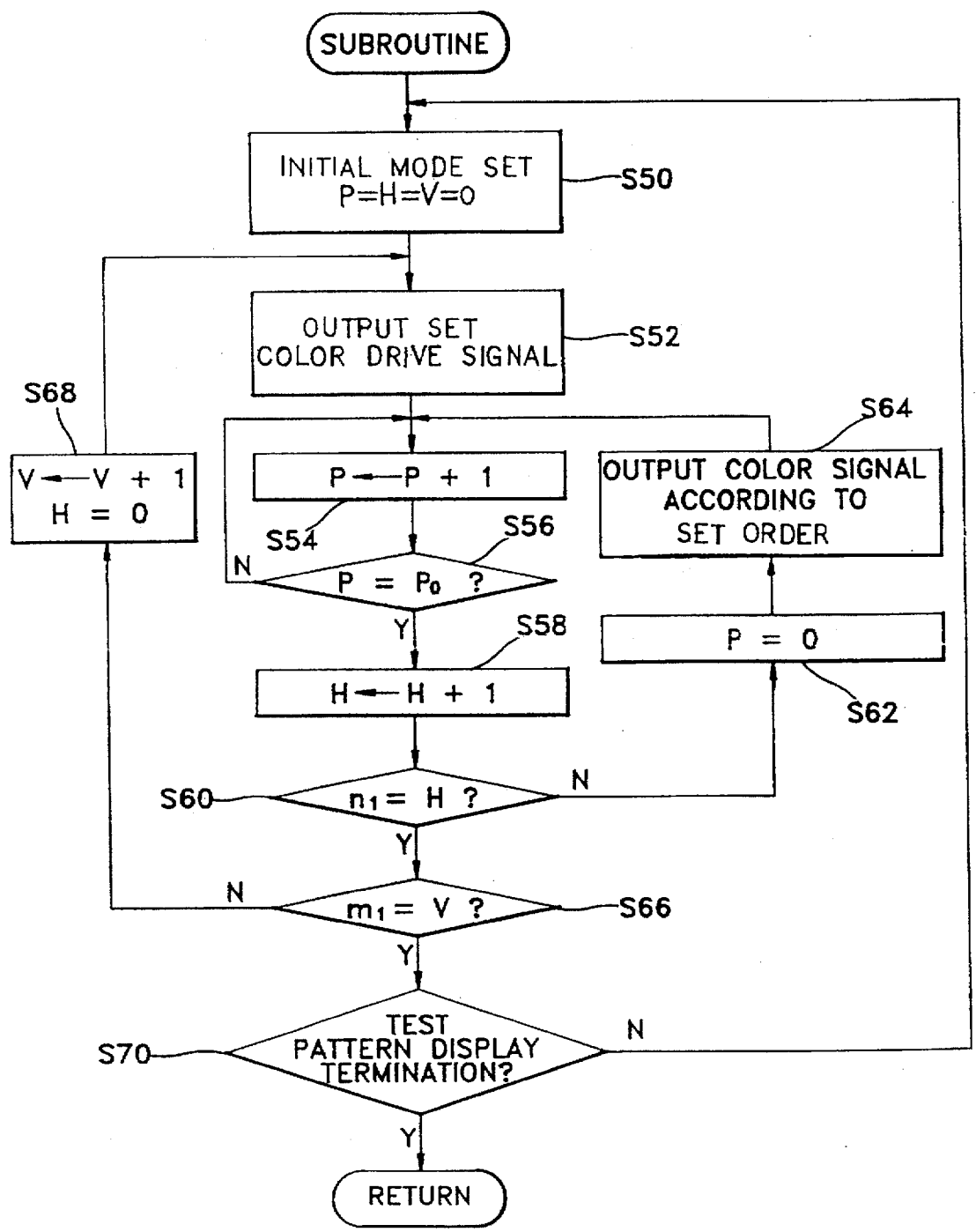

An initial mode should be set at step S22 of FIG. 6 in order to display the crosshatching pattern of FIG. 1A. The initial mode sets all values of a horizontal direction display parameter, 'a', a vertical direction display parameter, 'b', a horizontal direction division parameter, 'i', and a vertical direction division parameter, 'j' as '0'.

Likewise, after microcomputer 30 sets each parameter as '0' at step S22, a luminance signal Y is output as a 'low' level at step S24.

Also, an output state of the 'low' level of the luminance signal Y is maintained, microcomputer 30 executes step S26 for increasing the horizontal direction display parameter, 'a', and compares the increased parameter with a constant, 'A' established as a horizontal count reference time at step S28. If these two values are not identical, microcomputer 30 performs step S26 repeatedly, after executing a count operation as much as the reference time 'A', executes step S30 for outputting the luminance signal Y as a 'high' level during a predetermined time. At this time, it is sufficient that the predetermined time is a time of which the user can visibly recognize a straight line formed in the horizontal direction.

On the other hand, after performing step S30, microcomputer 30 executes step S32 for increasing the horizontal direction division parameter 'i' by '1', determines whether the increased horizontal direction division parameter 'i' is identical to the horizontal division constant 'n' at step S34 and, if not, re-executes step S24 but, if yes, executes step S36 for increasing the vertical direction display parameter 'b' by '1', and determines whether the increased vertical direction display parameter 'b' is identical to the vertical count reference time B at step S38.

At this time, microcomputer re-executes step S24 if the vertical count reference time 'B' is not identical to the vertical direction display parameter 'b'. If identical, microcomputer 30 executes step S40, and outputs the luminance signal as the 'high' level during a predetermined horizontal period. Here, it is sufficient that the predetermined horizontal period is a period of which the user can visibly recognize a straight line formed in the vertical direction.

After executing step S40, microcomputer 30 executes step S42 increasing the vertical direction division parameter 'j' by '1', determines whether a vertical division constant 'm' is identical to the increased vertical direction division parameter 'j' at step S44. If not, microcomputer 30 re-executes step S24, and if identical, since the crosshatching pattern formation is terminated as to the picture of one frame portion, if the test pattern display is terminated by the user, microcomputer 30 finishes its operation, and if not terminated, microcomputer 30 re-executes step S22, and executes the operation displaying the test pattern of the crosshatching type continuously.

Figure 1B:
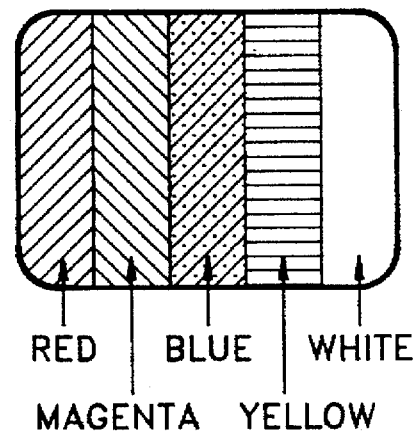

In order to display the test pattern of the color bar type of FIG. 1B, the initial mode should be set at step S50. The initial mode at this time sets all values of a horizontal direction display parameter 'H', a vertical direction display parameter 'V', and a horizontal direction count parameter 'P', established differently from the initial mode of a crosshatching pattern display step as '0'.

At this time, the horizontal direction display parameter 'H' is increased in the range of the unit number of a color region divided into '$n_1$' regions in the horizontal direction, the vertical direction display parameter 'V' is the number of times which the display of a horizontal period portion is repeated in order to form the test pattern of one frame portion, and the range is within a preestablished '$m_1$'. And, a horizontal direction count parameter 'P' is the time counted for the same color being displayed in the horizontal direction, and the limit is '$P_o$'.

Likewise, if the initial mode is set at step S50, microcomputer 30 executes step S52 for outputting a preestablished color drive signal corresponding to the data read from font memory 20. With reference to FIG. 1B, since the color bars are displayed in the order of red, magenta, blue, yellow, and white, the color drive signal output at step S52 becomes a red color drive signal.

The color drive signal is output continuously at step S52, and microcomputer 30 increases the horizontal direction count parameter 'P' by '1' at step S54, and determines whether the increased horizontal direction count parameter is '$P_o$'.

Microcomputer 30 re-executes step S54 for executing a count operation continuously, if the horizontal direction count parameter 'P' is not '$P_o$' at step S56, and if the horizontal direction count parameter 'P' is '$P_o$', the horizontal direction display parameter 'H' is increased by '1', and microcomputer 30 determines whether the increased horizontal display parameter 'H' is the same as '$n_1$'.

If the horizontal display parameter 'H' is not the same as '$n_1$', microcomputer 30 executes step S62 for setting the horizontal direction count parameter 'P' as '0'. After outputting a magenta color drive signal which will be displayed next in a preset order, microcomputer 30 re-executes step S54. And, if the horizontal direction display parameter 'H' is the same as '$n_1$', microcomputer 30 determines whether the vertical direction display parameter 'V' is the same as '$m_1$', if not, microcomputer 30 executes step S68 for setting the horizontal direction display parameter 'H' as '0', and at the same time, increasing the vertical direction display parameter 'V' by '1', thereafter re-executes step 52, and if the test pattern formation of one frame portion is terminated, microcomputer 30 executes step S70, and determines that the test pattern display is terminated.

Microcomputer 30 finishes the operation if microcomputer 30 determines that the test pattern display is terminated by a key manipulation of the user at step S70, and re-executes step S50 in order to display the test pattern continuously if there is no key manipulation of the user. Accordingly, since the color bar pattern is displayed as explained above, the user manipulates the key for picture adjustment provided on a keypad, to adjust a currently displayed picture.

As described above, the present invention provides easy picture adjustment by storing font data for the formation of a test pattern in the font memory and reading the stored data therefrom, to display the corresponding test pattern at any time.

In addition, the present invention can be applied to the manufacturing assembly line, where testing and/or repair has necessitated a readjustment of the display parameters. That is, nominal conditions can be reestablished without the use of a test pattern generator. Further, when field repair requires the realignment of display parameters, on-site adjustments can be made with ease.

What is claimed is:

1. A test pattern display apparatus for use in a television, said apparatus comprising:

storage means for storing font data of a unit picture of a test pattern having a predetermined shape, said unit picture constituting portions of horizontal lines of a video frame and portions of vertical lines of the video frame;

control means for repeatedly reading said stored font data of the unit picture and repeatedly outputting a drive signal corresponding to the read font data, thereby outputting data of one frame of said test pattern;

drive means for converting said output drive signal into an image signal and outputting the converted image signal; and display means for displaying the converted image signal as said test pattern.

2. A test pattern display apparatus according to claim 1, wherein said storage means stores said font data of the unit picture in order to form at least a crosshatching pattern and a color bar pattern.

3. A test pattern displaying method for displaying at least one type of test pattern for picture adjustment by storing font data of a unit picture for forming said at least one type of test pattern, said method comprising the steps of:

selecting a test pattern type according to a key input;

repeatedly reading the stored font data of the unit picture constituting portions of horizontal lines of a video frame and portions of vertical lines of the video frame according to said selected test pattern type thereby outputting data of one frame of the test pattern;

forming the test pattern corresponding to the selected pattern type based upon the repeatedly read font data; and displaying the formed test pattern.

4. A test pattern displaying method according to claim 3, wherein said test pattern formation step reads repeatedly the font data according to a crosshatching pattern.

5. A test pattern display method according to claim 3, wherein said test pattern forming step reads the font data according to a color bar pattern.

* * * * *